(12) United States Patent
Einstein et al.

(10) Patent No.: US 9,249,759 B1
(45) Date of Patent: Feb. 2, 2016

(54) NOZZLED MORTAR IGNITION SYSTEM FOR IMPROVED PERFORMANCE

(75) Inventors: Sandor I. Einstein, Denville, NJ (US); Donald S. Chiu, Fresh Meadows, NY (US); Alexander Colletti, Morristown, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 610 days.

(21) Appl. No.: 13/599,261

(22) Filed: Aug. 30, 2012

(51) Int. Cl.
*F42C 19/02* (2006.01)
*F42C 19/08* (2006.01)
*F02K 9/97* (2006.01)

(52) U.S. Cl.
CPC . *F02K 9/97* (2013.01); *F42C 19/02* (2013.01); *F42C 19/0807* (2013.01); *F42C 19/0819* (2013.01); *F42C 19/0826* (2013.01)

(58) Field of Classification Search
CPC .. F42C 19/08; F42C 19/0807; F42C 19/0819; F42C 19/0823; F42C 19/0826; F42C 19/085; F42C 19/02; F02K 9/97
USPC .................. 102/202, 372, 373, 445
See application file for complete search history.

(56) References Cited

U.S. PATENT DOCUMENTS

| | | | | |
|---|---|---|---|---|
| 4,711,180 A * | 12/1987 | Smolnik | ........................ | 102/445 |
| 5,069,130 A * | 12/1991 | Buckley et al. | ............... | 102/202 |
| 5,335,600 A * | 8/1994 | Horr et al. | ...................... | 102/470 |
| 6,286,432 B1 * | 9/2001 | Reider | ........................... | 102/470 |
| 8,607,702 B1 * | 12/2013 | Donadio et al. | ........... | 102/202.5 |
| 9,010,247 B2 * | 4/2015 | Caballer Barat | .............. | 102/357 |
| 9,016,203 B2 * | 4/2015 | Baumann et al. | ............. | 102/202 |

FOREIGN PATENT DOCUMENTS

FR 2559255 A * 8/1985
GB 1535733 A * 12/1978

* cited by examiner

*Primary Examiner* — James S Bergin
(74) *Attorney, Agent, or Firm* — Michael C. Sachs

(57) ABSTRACT

A mortar system includes a launch unit that comprises a mortar ignition cartridge provided with a flashtube. The flashtube incorporates a ring-like nozzle that is positioned within the flashtube, which acts to restrain the motion of the black powder pellets as well as to choke the flow of the resultant combustion products. The nozzle separates the flashtube into two compartments: a flashtube venting chamber and a pellet combustion chamber. The mortar ignition cartridge combustion chamber acts as the product-gas venting area of the flashtube. The combustion of the black powder pellets essentially takes place in the pellet combustion chamber. The present design modification improves the overall performance of the mortar system.

12 Claims, 5 Drawing Sheets

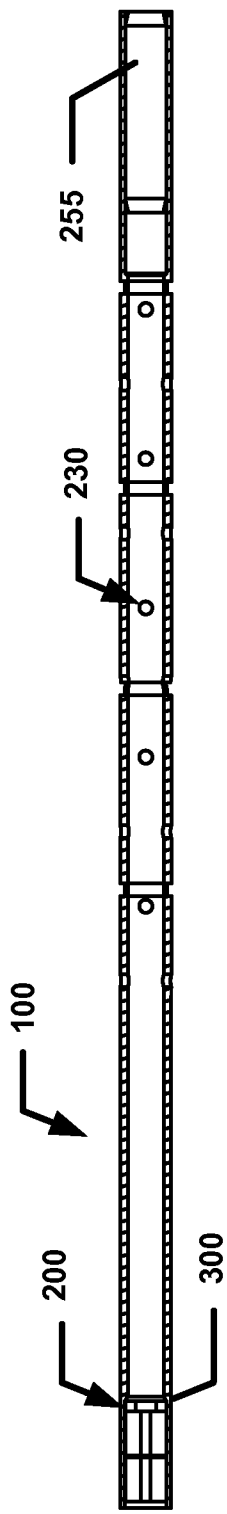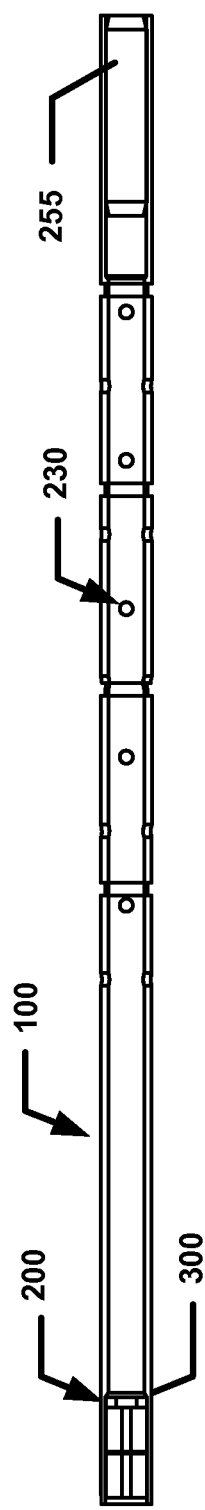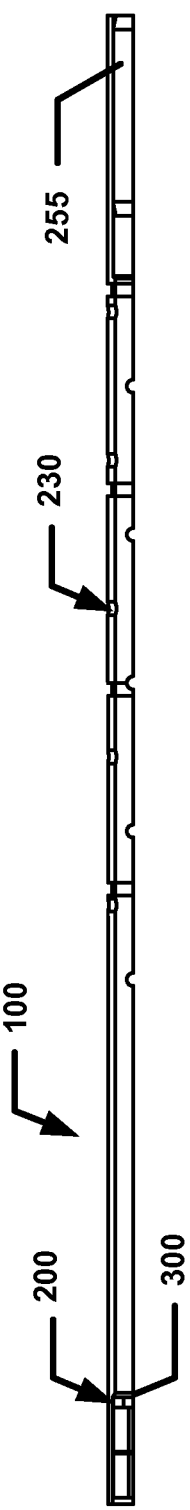

NOZZLED MORTAR IGNITION SYSTEM FOR IMPROVED PERFORMANCE

GOVERNMENTAL INTEREST

The invention described herein may be manufactured and used by, or for the Government of the United States for governmental purposes without the payment of any royalties thereon.

FIELD OF THE INVENTION

The present invention relates in general to the field of devices for launching mortar projectiles. Particularly, the present invention relates to a flashtube in a launch unit of the mortar. More specifically, a nozzle divides the flashtube into two compartments: a flashtube venting chamber and a pellet combustion chamber, in order to improve the performance of the mortar.

BACKGROUND OF THE INVENTION

The reliable performance of a propellant driven munition system is dependent on the performance of its propulsion unit. The ignition train has historically been the weakest link in the repeatability of the munition system. Coupling the initiation of the ballistic cycle through various intermediate steps until a smooth transition to full combustion is achieved is the key to reliability.

In a mortar system, the mortar propulsion system is initiated by either an electric or a percussion element in the primer head, which in turn ignites a black powder pellet(s) (igniter) in the base of the flashtube. The combustion products (including gases) are then vented through flash holes in the flashtube, igniting the propellant in the mortar ignition cartridge. The combustion products in the mortar ignition cartridge then vent through holes in the mortar boom. Gas pressure from the combustion products starts the motion of the mortar projectile through the launch tube and the pressure and temperature of the products ignites any additional propellant increments attached to the boom.

Dynamic and hydrodynamic processes occur during the ignition and combustion phase of the launch. The black powder pellet is seated on a small shoulder at the base of the flashtube. Once the black powder pellet starts to be consumed by the combustion process, its diameter starts to reduce and it becomes free to travel within the flashtube, driven by local pressure gradients.

Thus, the black powder pellet becomes free to oscillate within the flashtube, covering and uncovering flash holes in the flashtube and creating pressure oscillations within the mortar ignition cartridge. As combustion is driven by the local pressure that the propellant experiences, the oscillations within the flashtube can generate pressure waves within the mortar ignition cartridge, which can propagate even further into the main combustion chamber.

Since pressure is the driving force of the flashtube venting, it can cause the steel pin end of the flashtube to more vigorously initiate local combustion. This can cause further pressure waves within the mortar ignition cartridge, which can be transferred to the combustion in the launch tube.

At low zones of propelling charge, which has the lowest loading density of propellant in the mortar system, the effect of the waves may be minimal. At higher zones and loading densities, the pressure waves can cause erratic performance and, in the most severe instances, break fins off the mortar boom. This in turn causes an inaccurate trajectory and at worst a safety problem.

As a result, present mortar systems can have severe pressure waves in the flashtube that transfer and grow in the mortar ignition cartridge and the launch tube.

What is therefore needed is a nozzle for use in the flashtube of the mortar launch unit, in order to improve the performance of the mortar. The nozzle should create more homogeneous combustion among the black powder pellet(s) in the flashtube. The nozzle should result in a decrease in the variation, in terms of mass flow rate, of venting products from the flashtube vent holes. The nozzle should create a more consistent muzzle velocity of the mortar. The nozzle should result in a decrease in pressure waves within the flashtube and therefore within the mortar ignition cartridge. Prior to the advent of the present invention, the need for such a nozzle has heretofore remained unsatisfied.

SUMMARY OF THE INVENTION

The present invention satisfies this need, and describes a nozzle in a launch unit of a mortar system, where the launch unit has a propellant charge capable of generating propellant gas for launching the projectile from a barrel of the mortar.

It is an object of the present nozzle to create more stable and complete combustion among the black powder pellet(s) in the flashtube over the burn time of these pellet(s).

It is another object of the present nozzle to result in a decrease in the variation, in terms of mass flow rate, of venting products from the flashtube vent holes.

It is still another object of the present nozzle to result in a decrease in pressure waves within the flashtube and therefore within the mortar ignition cartridge.

It is yet another object of the present nozzle to create a more consistent muzzle velocity of the mortar.

These and other objects of the present invention are realized by a mortar system that includes a launch unit and a projectile that are threaded together. The launch unit comprises a mortar ignition cartridge that includes a flashtube, which in turn incorporates a nozzle that is made and positioned within the flashtube according to the teaching of the present invention.

The nozzle is inserted within the flashtube so that it sits on a shoulder which prevents the nozzle from sliding further into the flashtube. The nozzle separates the flashtube into two compartments: a flashtube venting chamber and a pellet combustion chamber. The flashtube venting chamber acts as the product-gas forming area of the flashtube.

The combustion of the black powder pellets takes place in the pellet combustion chamber because the nozzle acts as a hard stop, which keeps the solid phase of the propellant from combusting upstream. The flow of combustion products will be choked by the nozzle, which prevents upstream pressure oscillations from traveling back into the combustion area due to the nature of compressible flow.

BRIEF DESCRIPTION OF THE DRAWINGS

The above and other features of the present invention and the manner of attaining them will become apparent, and the invention itself will be best understood, by reference to the following description and the accompanying drawings, wherein:

FIG. 4 is a top view of the flashtube section of FIG. 3, further illustrating the position of the nozzle of FIG. 3 within the flashtube of the present invention;

FIG. 5 is a top view of the flashtube section of FIG. 4 with the cross-hatching removed;

FIG. 6 is a another view of the flashtube section of FIGS. 4 and 5;

Similar numerals refer to similar elements in the drawings. It should be understood that the sizes of the different components in the figures are not necessarily in exact proportion or to scale, and are shown for visual clarity and for the purpose of explanation.

DETAILED DESCRIPTION OF PREFERRED EMBODIMENTS

Figure 1:
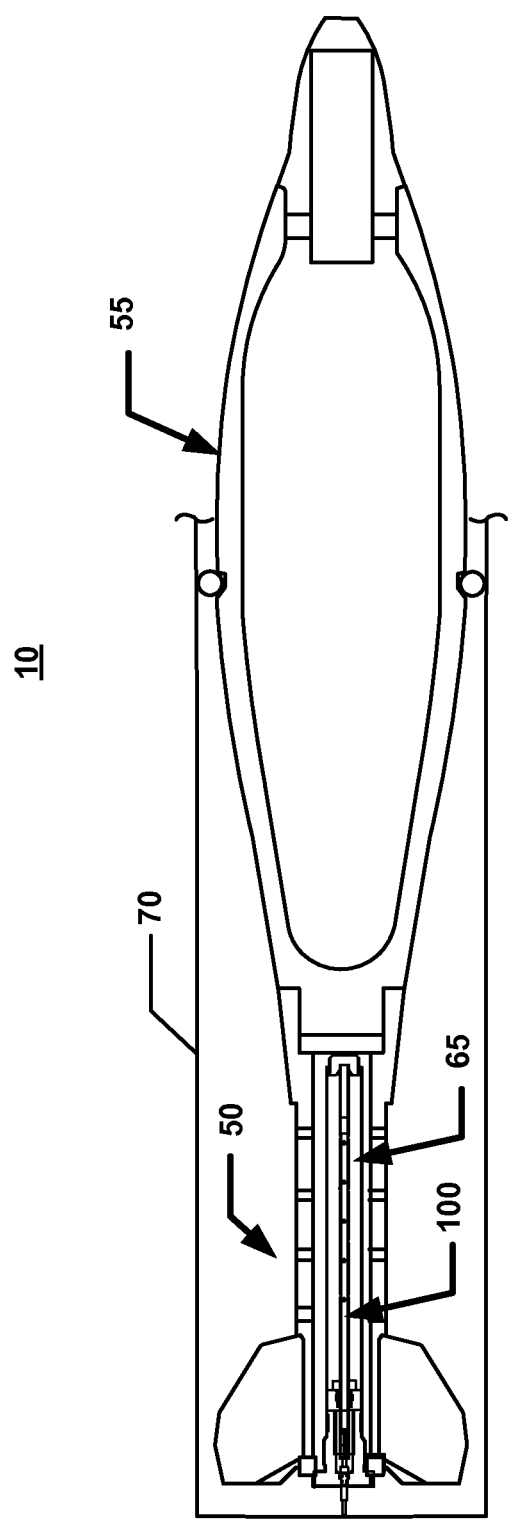
FIG. 1 is a cross-sectional view of a mortar bomb, with the cross-hatching removed for clarity of illustration, wherein the mortar bomb includes a launch unit that comprises a mortar ignition cartridge provided with a flashtube, which in turn, incorporates a nozzle according to the present invention.

With reference to FIG. 1, it illustrates a mortar system (also referred to herein as a mortar bomb or a mortar) 10 that includes a launch unit 50 and a projectile 55 that are connected with threads. The projectile 55 may be any suitable projectile that is either known or available in the field, and therefore its construction will not be discussed herein in detail.

Figure 2:
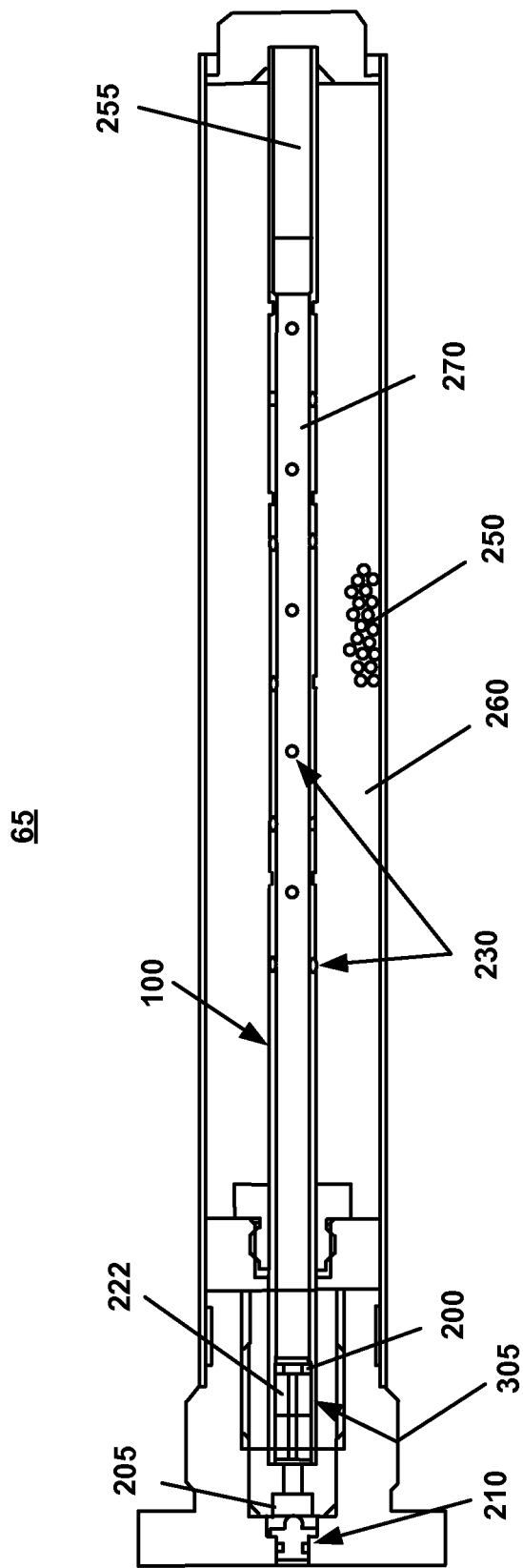
FIG. 2 is a cross-sectional view of the mortar ignition cartridge of FIG. 1, with the cross-hatching removed, further illustrating the flashtube of the present invention.

With further reference to FIG. 2, the launch unit 50 comprises a mortar ignition cartridge 65 that includes a flashtube 100, which in turn incorporates a ring-like, circular nozzle 200 according to the present invention.

When the projectile 55 is dropped into a muzzle of a mortar tube 70 (FIG. 1), the ignition train is started through the action of a percussion primer 205 striking a firing pin 210. The gases and hot solid salts evolved by the percussion primer 205 initiate a couple of centrally perforated black powder pellets 222. Through shock and solid impact by the percussion primer combustion products 205, the pellets 222 break up and combust. These black powder pellets 222 are contained within a pellet combustion chamber 305 of the flashtube 100 where the product gases and small solid particles can leave through a series of radial vent holes 230 that are positioned axially relative to the flashtube 100. The vent holes 230 are evenly spaced about the circumference of the flashtube 100.

When the combustion gases exit the flashtube 100, they impinge on and ignite a bed of solid granular propellant bed 250 contained within a mortar ignition cartridge combustion chamber 260 of the mortar ignition cartridge 65, which may in turn ignite several additional charge rounds. The upstream end of the flashtube 100, is sealed, in this case with a steel pin 255, so that the combustion gases exit only though the radial vent holes 230.

The uniformity of ignition of the solid granular propellant bed 250, including optional charge rounds, is critical for the formation of propelling gases that move the mortar system 10 consistently. Critically, the formation of high pressure gradients will have the effect of reducing repeatability and, in turn, accuracy of the weapon system.

Pressure gradients in the flashtube 100 are caused by a variety of factors. The combustion of the black powder pellets 222 is subject to non-uniform ignition, mechanical break-up, and resulting movement of the pellets 222. There is also a complex shock interaction inside the flashtube 100. The initial burning sets up a pressure wave which travels down the flashtube 100 and eventually reflects back towards the burning grains. There will be a normal shock at some length down the flashtube 100 whose location will be affected by instantaneous flow characteristics, friction, and mass loss down the length of the flashtube 100 through the vent holes 230.

The problem with the combustion of the black powder pellets 222, in the absence of the nozzle 200, is that it tends to be a highly unrepeatable event due to its hydroscopic nature, loose tolerances in chemical composition, and brittleness. In addition, such mortar system would suffer from the propagation of pressure waves in the flashtube 100 that transfer to the mortar ignition cartridge 65 and the flashtube venting chamber 270.

With further reference to FIGS. 3 through 6, the present invention addresses this problem by integrating the nozzle 200 above the black powder pellets 222, or any other igniter, in a primer head above the igniter, creating a pellet combustion chamber 305. The newly created pellet combustion chamber 305 gives more reproducible combustion of the igniter, a more isochronic ignition pulse through the flash holes 230, a smoother combustion of the propellant bed 250 in the mortar ignition cartridge 65, and fewer waves traveling from the combustion chamber 305 into the flashtube venting chamber 270.

Figure 3:
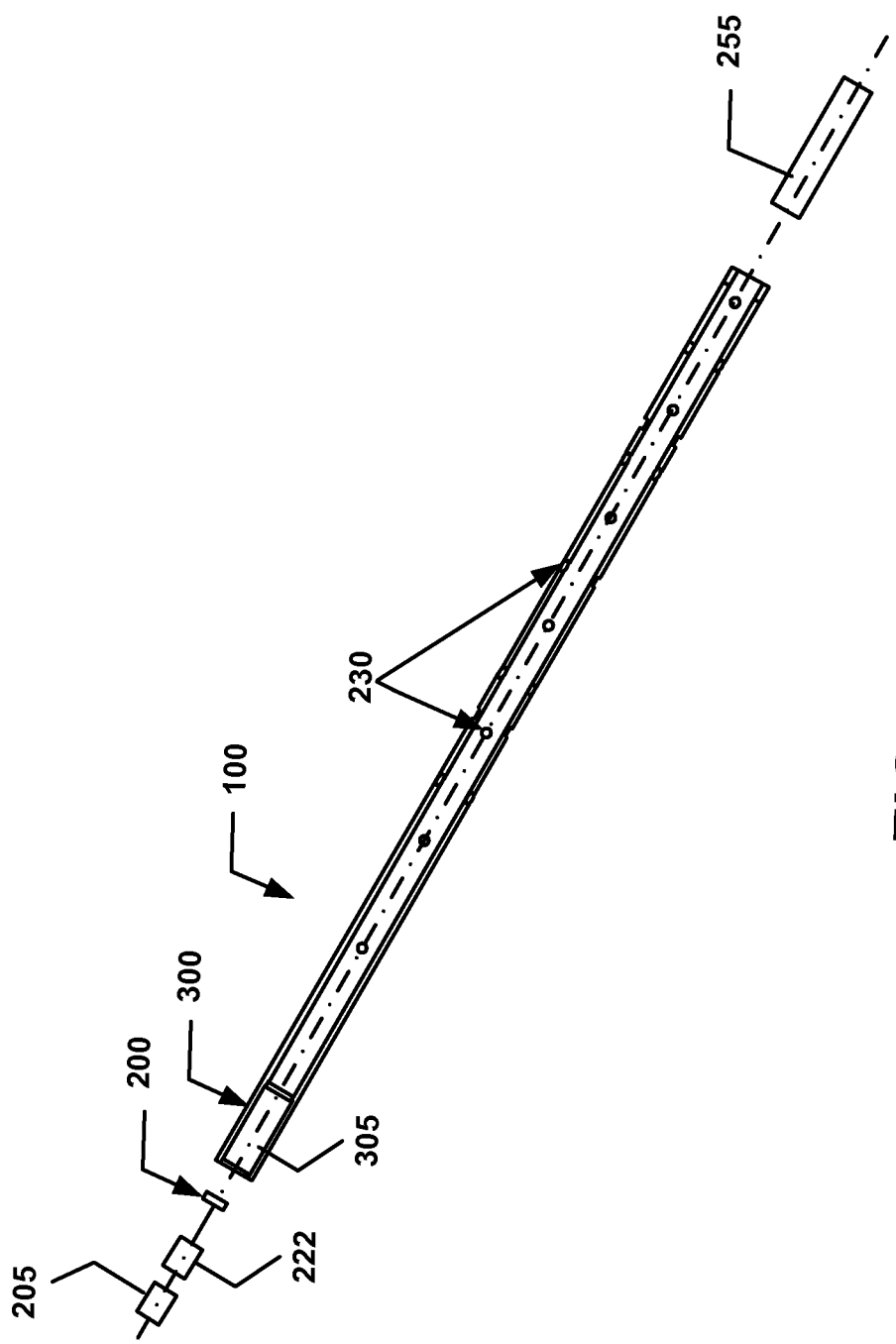
FIG. 3 is a cross-sectional, exploded view of the flashtube of FIGS. 1 and 2, with the cross-hatching removed, further illustrating the nozzle of the present invention.

To this end, the nozzle 200 is inserted within the flashtube 100 so it seats on a shoulder 300 of the flashtube 100, which acts as a stop, to prevent the nozzle 200 from sliding further within the flashtube 100. As a result, the nozzle 200 separates the flashtube 100 into two compartments: the flashtube compartment 270 (FIG. 2) and the pellet combustion chamber 305 (FIG. 3). The sizes and lengths of the various components would be defined by the specific mortar system that is in use and its ignition system. The pellet combustion chamber 305 acts as the product-gas evolution area for the flashtube 100.

The combustion of the black powder pellets 222 essentially takes place in the pellet combustion chamber 305 because the nozzle 200 keeps the black powder pellets 222 from moving into the flashtube venting chamber 270. The present flashtube 100 can be used as a replacement of, or in conjunction with conventional flashtubes with no further modifications to the mortar system 10.

The present flashtube 100 produces even burning and leaves less solid, unburned particulate matter before the combustion products enter the launch tube pellet combustion chamber 305 of the flashtube 100. In one exemplary embodiment, five black powder pellets 222 were retained held in place by a small shoulder 300. During pellet combustion, and without the insertion of the nozzle 200, the black powder pellets 222 break-up and large pieces easily travel down the length of the flashtube 100, to the launch tube pellet combustion chamber 305. By placing the nozzle 200 against the shoulder 300, the combustion is enhanced in several ways.

The choked flow of the combustion products at the end of the combustion chamber 305 acts as a quasi-solid boundary to upstream pressure disturbances, in that it acts as a solid boundary to fluids without actually being solid. Pressure waves reflecting off the end of the flashtube 100, which would otherwise feed back into the pellet combustion chamber 305 are significantly reduced if not entirely eliminated. The choked flow acts to damp out the affect of pressure wave interaction with the combustion of the black powder pellets 222.

The choked flow results in a higher pressure within the pellet combustion chamber 305, than without the nozzle 200. This high combustion pressure feeds back to increase the rate of the propellant consumption, thus decreasing the likelihood of uncombusted propellant (250) fragments escaping the pellet combustion chamber 305.

Figure 9:
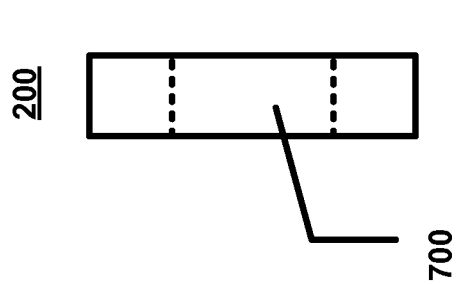
FIG. 9 is a side view of the nozzle of FIGS. 7 and 8.
Figure 8:
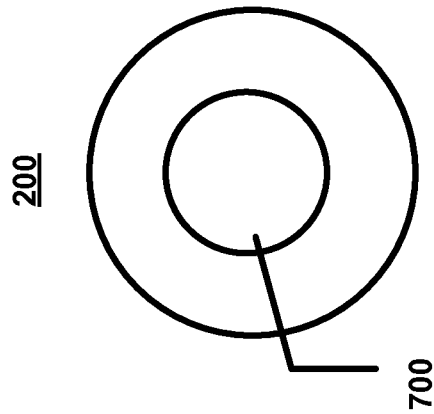
FIG. 8 is a front view of the nozzle of FIG. 7.
Figure 7:
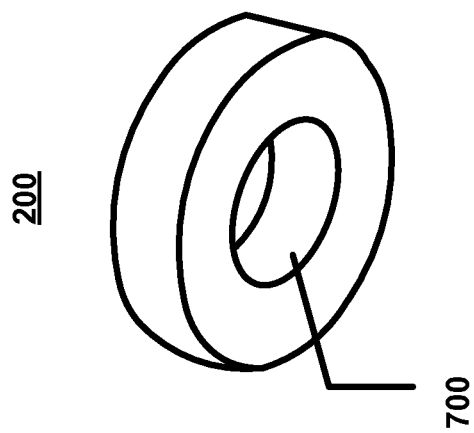
FIG. 7 is a perspective view of the nozzle of FIG. 3.

With further reference to FIGS. 7, 8, and 9, the nozzle 200 is generally cylindrically shaped, with a central orifice 700 formed in its center. According to an exemplary embodiment, the nozzle throat diameter is sized according to compressible flow relations, wherein the outer diameter of the nozzle 200 is approximately equal to the inner diameter of the pellet combustion chamber (305) end of the flashtube 100. The nozzle 200 is preferably made of an integral piece of metal. It should however be understood that the nozzle can be made from any non-flammable, heat resistant materials, such as metals and ceramics.

Also, the physical barrier presented by the central orifice 700 of the nozzle 200 keeps larger propellant fragments constrained in the pellet combustion chamber 305, and out of the launch tube combustion chamber 270. The confined pellet combustion chamber 305 creates an essentially isochoric pellet combustion chamber 305 that enhances mixing of hot propellant gases and therefore increases the amount of propellant allowed to go to complete combustion. An additional benefit is that more complete propellant combustion in the pellet combustion chamber 305 will require fewer black powder pellets 222 to transfer the same amount of energy to the propellant bed 250.

Furthermore, burning the black powder pellets 222 at higher pressure and temperature more completely will mitigate the effects of its hygroscopicity. The black powder pellets 222 absorb moisture as a function of processing methods and environmental exposure. The degree of absorption of individual pellets in the mortar system 10 is unknown before firing. Water in the black powder pellets 222 acts to decrease the total energy released during the reaction. Also, more energy is released from the black powder pellets 222 themselves as new reaction pathways open at higher temperatures created in the pellet combustion chamber 305.

The nozzle 200 provides additional advantages, among which are the following: The nozzle 200 creates the separate pellet combustion chamber 305 for the black powder pellets 222 for more reproducible combustion. It alleviates large variations in flashtube 100 performance due to the hygroscopicity of the black powder pellets 222 within the pellet combustion chamber 305. The nozzle 200 also changes the point of choked flow from the vent holes 230 in the flashtube 100 to the nozzle 200, yielding more uniform flow through the flash holes 230. The nozzle 200 further decreases the pressure gradient within the flashtube 100, leading to a more isochronic ignition of the ignition cartridge propellant bed 250.

Although the present flashtube 100 has been described in connection with an exemplary mortar system 10, it should be clear that the flashtube 100 is not limited to the particular embodiments described herein. It should be understood that other modifications may be made to the present flashtube 100 without departing from the spirit and scope of the invention.

What is claimed is:

1. A mortar projectile (55) having a mortar ignition cartridge (65) comprising a bed of loose powder propellant (250) and wherein the propellant is ignited through a percussion primer (205) striking a firing pin (210), leading to activation of a launch unit (50) secured within said mortar ignition cartridge, and wherein said launch unit comprises:
    a flashtube (100), whose pressure is sealed by an end steel pin (255);
    a ceramic nozzle (200) that divides the flashtube into two compartments: a pellet combustion chamber (305) and a flashtube venting chamber (270);
    wherein the pellet combustion chamber contains pellets (222) that generate combustion products after being struck by the firing pin;
    wherein the nozzle acts as a quasi-solid boundary to flashtube venting chamber pressure disturbances for choking the flow of pellet combustion products toward the flashtube venting chamber; and
    wherein the flashtube venting chamber acts as a product-gas forming area and includes a plurality of vent holes (230) that allow at least some of the combustion products to escape outside the flashtube and to impinge on, and ignite said propellant.

2. The mortar projectile according to claim 1, wherein the nozzle is inserted within the flashtube against a shoulder (300) that prevents the nozzle from sliding into the flashtube.

3. The mortar projectile according to claim 2, wherein the nozzle has a ring-like, circular configuration.

4. The mortar projectile according to claim 2, wherein the nozzle is generally cylindrically shaped.

5. The mortar projectile according to claim 4, wherein the nozzle includes a central orifice.

6. A mortar having a mortar ignition cartridge comprising a bed of propellant and wherein said propellant is ignited through action of a launch unit secured within said mortar ignition cartridge and wherein said launch unit comprises:
    a flashtube;
    a nozzle that divides the flashtube into two compartments: a pellet combustion chamber and a flashtube venting chamber;
    wherein the pellet combustion chamber contains pellets that generate combustion products;
    wherein the nozzle acts as a quasi-solid boundary to flashtube venting chamber pressure disturbances for choking the flow of the combustion products toward the flashtube venting chamber; and
    wherein the flashtube venting chamber acts as a product-gas forming area and includes a plurality of vent holes that allow at least some of the combustion products to escape outside the flashtube and to impinge on, and ignite said propellant.

7. The mortar according to claim 6, wherein the nozzle is inserted within the flashtube against a shoulder that prevents the nozzle from sliding into the flashtube.

8. The mortar according to claim 7, wherein the nozzle has a ring-like, circular configuration.

9. The mortar according to claim 8, wherein the nozzle is generally cylindrically shaped.

10. The mortar according to claim 9, wherein the nozzle includes a central orifice.

11. The mortar according to claim 10, wherein the nozzle is made of an integral piece of metal.

12. The mortar according to claim 10, wherein the nozzle is made from a ceramic material.

* * * * *